Oct. 20, 1931.  H. M. BUNKER  1,828,554
MACHINE FOR FORMING TUBULAR FABRICS
Filed March 15, 1929   4 Sheets-Sheet 4

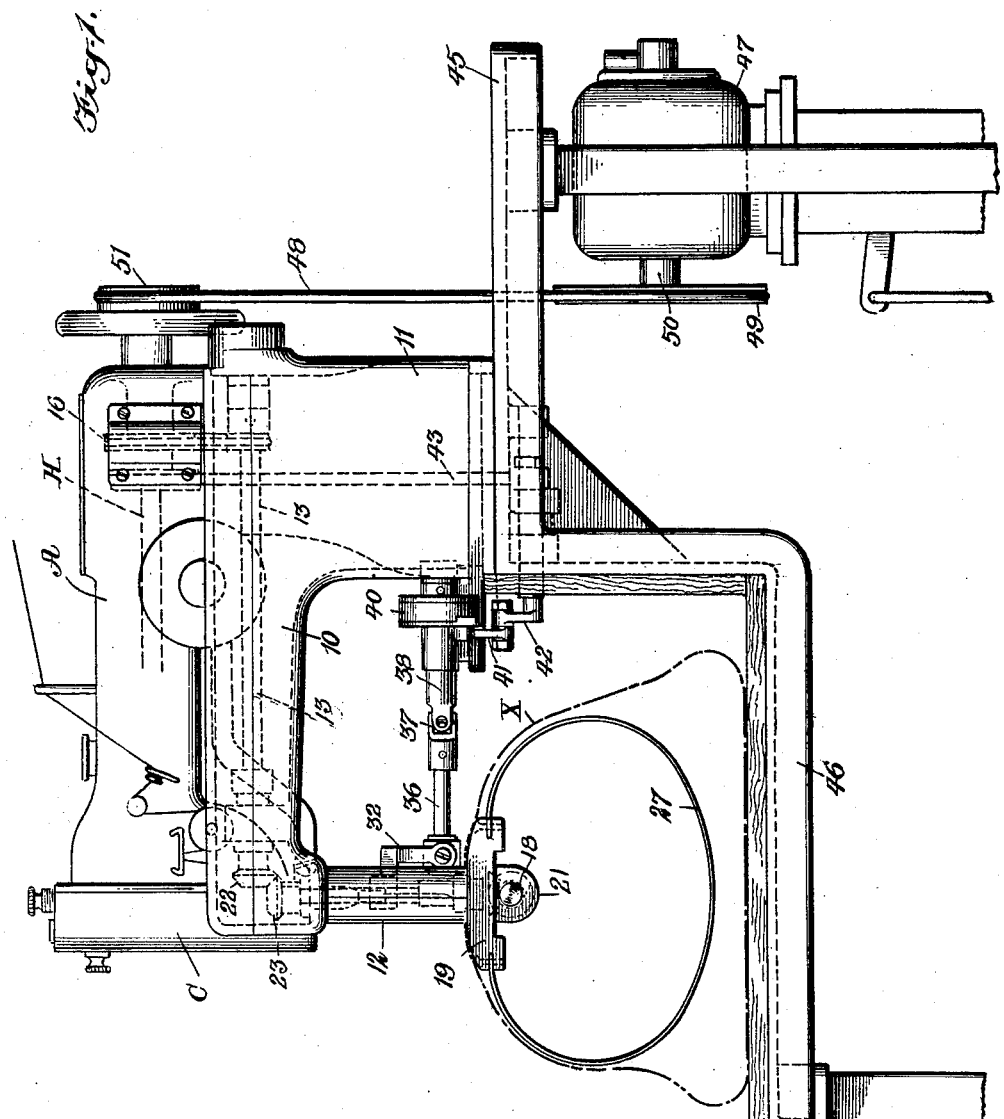

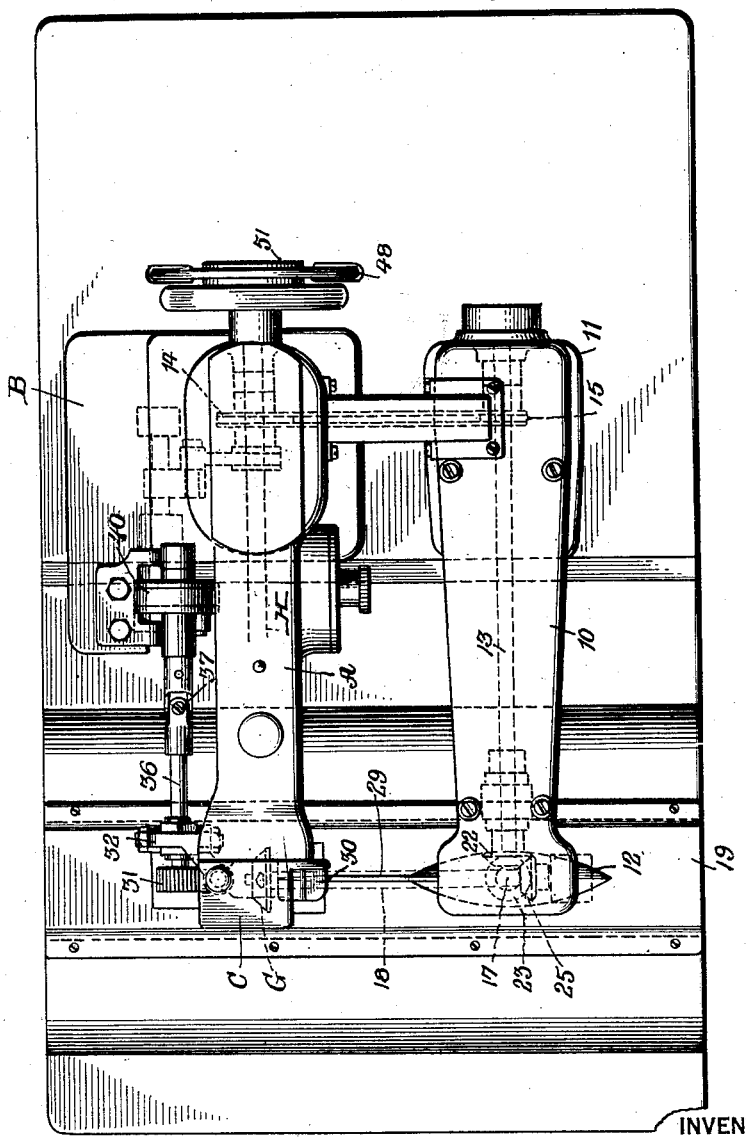

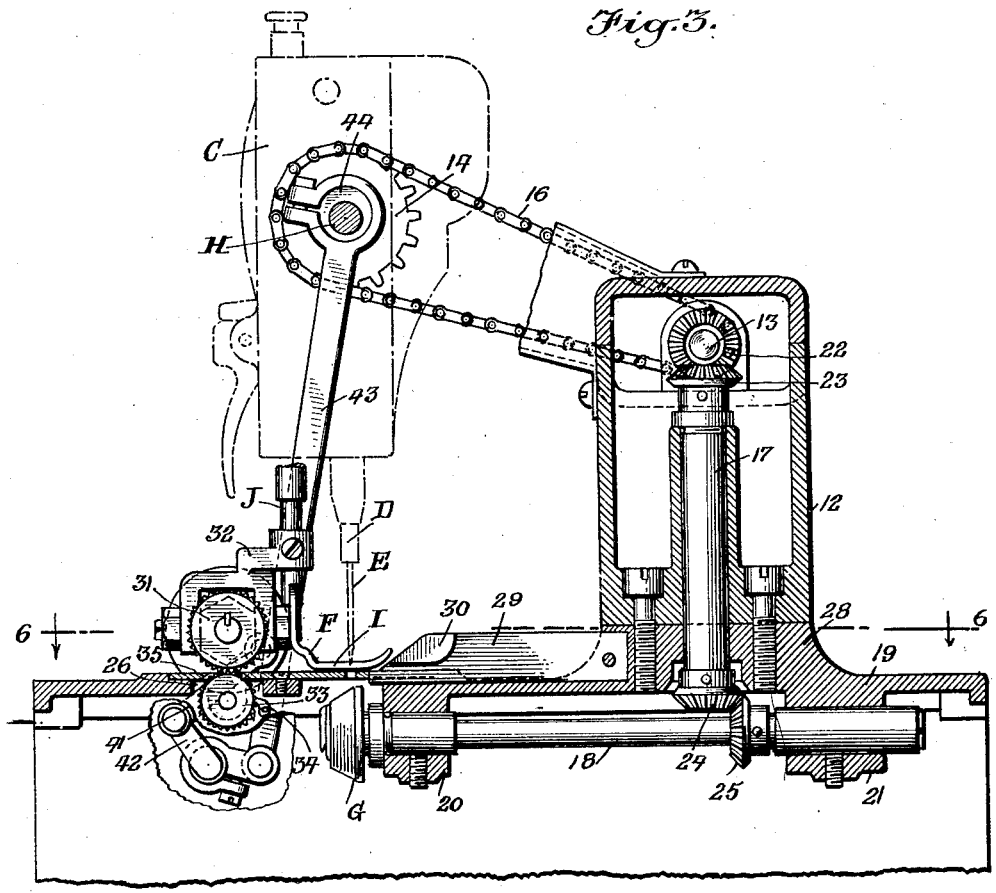

WITNESSES

INVENTOR
Horace M. Bunker
BY
ATTORNEYS

Patented Oct. 20, 1931

1,828,554

UNITED STATES PATENT OFFICE

HORACE M. BUNKER, OF NEW YORK, N. Y., ASSIGNOR TO H. M. BUNKER & COMPANY, INC., OF NEW YORK, N. Y., A CORPORATION OF NEW YORK

MACHINE FOR FORMING TUBULAR FABRICS

Application filed March 15, 1929. Serial No. 347,305.

This invention relates to a machine for forming a tubular material from a strip of fabric by securing together the edges of the strip, and the same is in the nature of an improvement over prior United States Letters Patent Reissue No. 16,517, granted January 4, 1927.

In the prior patent, the tubular material was produced by stitching through the overlapped edges of a transversely folded material which left protruding free edges beyond the line of stitching, thereby necessitating the opening up and flattening down of said edges, in order to avoid difficulties incident to the subsequent spiral cutting of the material by a bias cutting machine set forth in prior United States Letters Patent No. 1,581,051, granted on April 13, 1926.

In practice, bias cloth produced by a bias cutting machine from tubular material thus formed has been found objectionable when used in many industries, and it is, therefore, an object of the present invention to provide an improved machine for forming tubular material which functions to join the side edges of a strip of fabric in abutting relation to provide a tubular material having a substantially flush joint.

The invention aims as a further object to provide a machine of this character by virtue of which the stitching extends radially of the tubiformed strip so as to eliminate seam edges which require an opening up and pressing down operation.

The invention furthermore comprehends a machine of the character set forth and for the purpose specified in which the shuttle is arranged within the confines of the tubiformed strip of material which is being operated upon, together with means for transmitting motion to the shuttle without obstructing the path of movement of the tubiformed strip.

The invention further contemplates in a machine of this character guide means for properly directing the edges of the material to be joined, to the stitching mechanism so as to insure proper joining of the edges when operating the stitching mechanism at a high rate of speed.

The invention further embodies an improved feed for taking off the material from the stitching mechanism which is driven in such a manner as to avoid interference with the path of movement of the material.

Other objects of the invention reside in the comparative simplicity of construction of the machine, the economy with which it may be produced and operated and the general efficiency derived therefrom.

With the above recited and other objects in view, reference is had to the following description and accompanying drawings, in which there is exhibited one example or embodiment of the invention, while the claims define the actual scope of the same.

In the drawings:

Figure 1 is a side view of the machine.

Figure 2 is a plan view thereof.

Figure 3 is an end view on an enlarged scale with parts broken away and shown in section.

Figure 4 is a fragmentary detail sectional view taken approximately on the line 4—4 of Figure 5.

Figure 5 is a fragmentary sectional view taken approximately on the line 5—5 of Figure 4.

Figure 6:
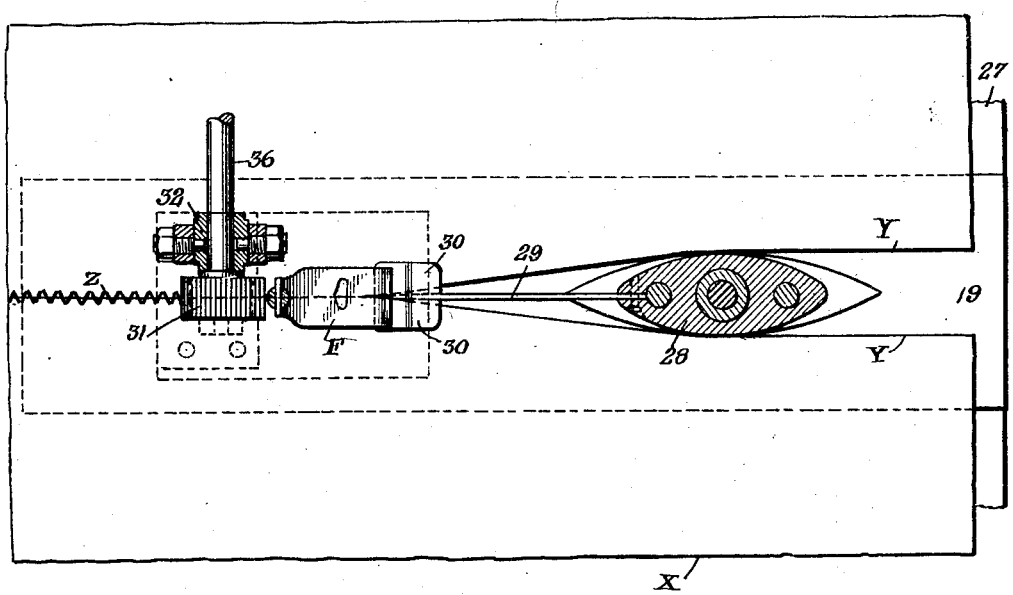
Figure 6 is a sectional plan view taken approximately on the line 6—6 of Figure 3.
Figure 7:
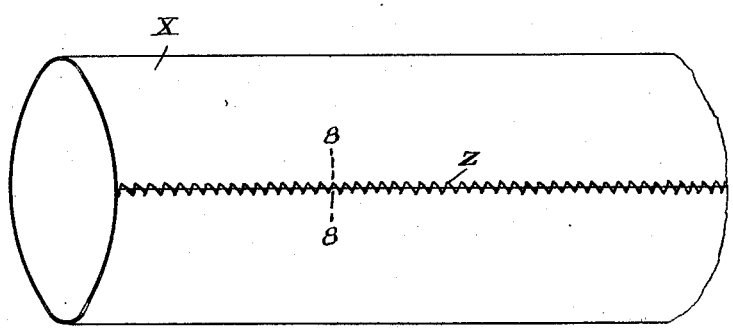
Figure 7 is a perspective view of the tubular material produced by the machine.
Figure 8:
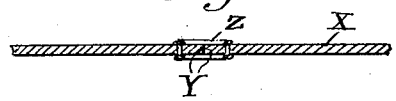
Figure 8 is an enlarged transverse fragmentary sectional view taken approximately on the line 8—8 of Figure 7, and illustrating the seam.

Referring to the drawings by characters of reference, A designates the usual machine arm which is supported by a base B at one end and which is provided with the head C at the opposite end carrying needle bar D, needle E and presser foot F which constitute a part of the stitching mechanism. In addition to these elements, the stitching mechanism includes the shuttle G which is of the rotary hook type and which is designed to cooperate with the needle and other parts of the stitching mechanism to produce a zigzag stitch. Ordinarily, motion is transmitted to the shuttle G by a driving element which extends transversely of the path of travel of the material, but, obviously, such an arrangement would not afford clearance where a strip of material is to be stitched in tubiform to produce a tubular material, as it is apparent that a driving element or connection would obstruct or interfere with the feeding of the tubiform material. The present invention, therefore, resides in the provision of a driving element or connection for transmitting motion to the shuttle which is so arranged as to extend into the tubiformed strip between the spaced edges thereof in advance of the point of stitching. This is accomplished by providing the machine with a second arm 10 having a supporting base 11 and arranged alongside of or in front of the usual arm A in substantially parallel relation thereto, which arm is provided with a depending horn 12 at its free end adapted to extend between the spaced edges of the tubiformed strip at a point in advance of the point where the actual stitching and joining of the edges of the fabric is accomplished by the stitching mechanism. The auxiliary or supplemental arm 10 provides a housing for a counter-shaft 13 mounted therein for rotation, which counter-shaft is suitably driven from the main drive shaft H of the machine in any suitable manner, such as by the sprockets 14 and 15 and a sprocket chain 16 or their equivalent. Motion from the shaft 13 is transmitted by a vertically depending shaft 17 or its equivalent extending downwardly through the horn 12 to a rearwardly extending shaft 18 extending axially of the tubiform strip X and within the confines thereof. The rear end of the shaft 18 at a point directly underlying the needle has attached thereto the shuttle G. The lower end of the horn carries a table 19 which extends forwardly from the horn and rearwardly beyond the point of stitching, and said table is formed with bearings 20 and 21 in which the rearwardly extending shaft 18 is journaled. The shaft 17 as disclosed is driven from the counter-shaft 13 by means of the meshing miter gears 22 and 23, while the shaft 18 is driven from the shaft 17 by the meshing miter gears 24 and 25. The table is formed with an opening 26 in which the bed plate I of the stitching mechanism is arranged. In practice, a tubular shield and form element 27 is carried by the table 19, said element being formed of a sheet of material bent into tubiform with the side edges secured to the opposite side edges of the table. From the foregoing, it will thus be seen that the shuttle element G of the stitching mechanism is disposed within the confines of the tubiformed strip X at the point of stitching and that means for transmitting motion to said shuttle extends into the tubiformed strip X between the spaced edges Y thereof at a point in advance of the point of stitching so as to afford a clear and unobstructed passageway for manually presenting the same to the stitching mechanism. The element 27 in addition to facilitating the arranging and manual guiding of the material through the machine acts as a shield to prevent grease, oil or the like from dropping onto the tubiform material X. The table 19 at its juncture with the horn 12 is provided with an upstanding boss 28 which is of substantially a narrow elliptical shape. A guide web 29 extends from the rear end of the boss to a point directly in front of the presser foot F and the rear edge of the web 29 is feathered or sharpened approximately to a knife edge. The upper rear portion of the web is provided with laterally projecting ears 30, the under surfaces of which are spaced slightly above the upper surface of the table 19. The opposite sides of the web serve in the nature of a guide against which the spaced side edges Y of the tubiform material X are adapted to be guided inwardly to the point of stitching where they are brought into abutting relation for connection by the zigzag stitch Z.

In order to provide means for intermittently feeding the material coincident with the stitching mechanism, a driven feeding roller 31 having a serrated periphery is mounted and suitably supported from the machine head C in rear of the presser foot. Preferably, as illustrated, the roller supporting bracket 32 is directly carried by the presser foot bar J. In addition to the driven feed roller which engages with the upper surface of the material, an idler feed roller 33 is employed which is held against retrograde movement by a pawl 34 and which is suitably supported under the bed plate and extending into an aperture 35 in said bed plate. The means for transmitting intermittent motion to the driven feed roller 31 consists of a shaft section 36 connected by a universal joint 37 to a shaft section 38. The shaft section 38 is keyed to the core 39 of a friction clutch, the casing 40 of which is rocked or partially turned in opposite directions by a link 41 actuated by a bell crank 42 which is in turn moved by a pitman 43 driven by an eccentric 44 on the main drive shaft H in the machine arm A.

Preferably, the machine arms A and 10 are supported by a table 45 which has a downwardly offset portion 46 underlying the shield and form element 27. The motor 47 for driving the main shaft H of the machine may be mounted under the upper level of the table 45, as illustrated, and suitably connected by a belt 48 which is trained around a sheave 49 on the motor shaft 50 and around a sheave 51 on the main drive shaft H.

In practice, the operator feeds the leading end of the strip to the stitching mechanism under the presser foot by bringing the opposite edges Y—Y together around the element 27 with said edges Y—Y in abutting relation at the point of stitching and with said edges in contact with the guide web 29 and around the opposite sides of the boss 28. After the stitching operation has been initiated, the operator merely continues to guide the edges Y—Y against the opposite sides of the boss 28.

From the foregoing, it will thus be seen that a machine for forming tubular material from a strip of fabric has been devised, by virtue of which the shuttle of the stitching mechanism disposed within the confines of the tubiformed strip at the point of stitching, may be driven without obstructing the path of movement of the strip.

What is claimed is:

1. In a machine for forming tubular material from a strip, a stitching mechanism including a shuttle disposed within the confines of the tubiformed strip at the point of stitching, a motion transmitting element for the shuttle extending into the tubiformed strip between the spaced edges thereof and means in rear of the stitching mechanism for feeding the material including an idler feed element arranged within the confines of the tubiformed strip and a driven feed element cooperating therewith disposed beyond the confines of said tubiformed strip.

2. In a machine for forming tubular material from a strip, a stitching mechanism including a shuttle disposed within the confines of the tubiformed strip at the point of stitching, a motion transmitting element for the shuttle extending into the tubiformed strip between the spaced edges thereof, means in rear of the stitching mechanism for feeding the material including an idler feed element arranged within the confines of the tubiformed strip and a driven feed element cooperating therewith disposed beyond the confines of said tubiformed strip and a driving means for said driven feed element.

3. In a machine for forming tubular material from a strip, a stitching mechanism including a bed plate, a shuttle arranged below the bed plate and a driving means arranged above the bed plate; means for transmitting motion to said shuttle from said driving means at a point in advance of the point of stitching and between the spaced side edges of the strip, feeding means in rear of the stitching mechanism including an idler feed element within the confines of the stitched tubular strip, a cooperating driven feeding element disposed exteriorly of the confines of the stitched tubular strip and a driving connection between said driving means and the driven feeding element.

Signed at New York, in the county of New York, and State of New York this 12th day of March, A. D. 1929.

HORACE M. BUNKER.